US009208330B2

(12) United States Patent
Srinivasan et al.

(10) Patent No.: US 9,208,330 B2
(45) Date of Patent: Dec. 8, 2015

(54) SYSTEM FOR EXECUTION OF SECURITY RELATED FUNCTIONS

(71) Applicant: LSI Corporation, San Jose, CA (US)

(72) Inventors: Krishnan Srinivasan, San Jose, CA (US); Igor Kucherenko, Moscow (RU); Nikola Radovanovic, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/176,773

(22) Filed: Feb. 10, 2014

(65) Prior Publication Data

US 2015/0220744 A1 Aug. 6, 2015

Related U.S. Application Data

(60) Provisional application No. 61/934,940, filed on Feb. 3, 2014.

(51) Int. Cl.

| | |
|---|---|
| ***G06F 21/76*** | (2013.01) |
| ***G06F 21/60*** | (2013.01) |
| ***H04L 9/08*** | (2006.01) |
| ***H04L 9/30*** | (2006.01) |

(52) U.S. Cl.

CPC ............ *G06F 21/602* (2013.01); *G06F 21/606* (2013.01); *G06F 21/76* (2013.01); *H04L 9/0841* (2013.01); *H04L 9/30* (2013.01)

(58) Field of Classification Search

None

See application file for complete search history.

(56) References Cited

U.S. PATENT DOCUMENTS

| | | | | |
|---|---|---|---|---|
| 6,028,939 | A * | 2/2000 | Yin | 713/189 |
| 7,124,296 | B2 | 10/2006 | Krishna et al. | 713/161 |
| 8,639,923 | B2 | 1/2014 | Lo et al. | 713/159 |
| 2008/0101613 | A1 * | 5/2008 | Brunts et al. | 380/279 |
| 2008/0144810 | A1 * | 6/2008 | Gopal et al. | 380/30 |
| 2012/0011351 | A1 | 1/2012 | Mundra et al. | 713/1 |
| 2012/0087488 | A1 * | 4/2012 | Engels et al. | 380/28 |
| 2013/0332707 | A1 | 12/2013 | Gueron et al. | 712/222 |
| 2013/0332744 | A1 | 12/2013 | Zhuang | 713/189 |
| 2014/0019725 | A1 | 1/2014 | Ozturk et al. | 712/221 |
| 2014/0019764 | A1 | 1/2014 | Gopal et al. | 713/176 |
| 2014/0032935 | A1 | 1/2014 | Kim et al. | 713/193 |

* cited by examiner

*Primary Examiner* — David Pearson

(74) *Attorney, Agent, or Firm* — Suiter Swantz pc llo

(57) ABSTRACT

An apparatus having a first memory circuit, a plurality of arithmetic modules, and a plurality of second memory circuits. The first memory circuit may be configured to read or write data to or from a host. The plurality of arithmetic modules each may be configured to be enabled or disabled in response to control signals received from the first memory circuit. The plurality of second memory circuits may be configured to read or write data to or from the first memory circuit through a data exchange layer. The arithmetic modules provide cryptographic protection of the data.

20 Claims, 6 Drawing Sheets

200
210
HOST PROCESSOR
220
COMMAND FIFO
270
DEBUG MANAGER
280
SYSTEM INTERFACE
282
INTERRUPT MANAGER
284
STATUS MANAGER
230
DATA EXCHANGE LAYER
240
SRAM CLUSTER
242a
242b
242c
242d
242e
242m
244
SRAM CLUSTER
246a
246b
246c
246d
246e
246m
250a
INTERCONNECT
250b
INTERCONNECT
260a
ARITHMETIC MODULE
260b
ARITHMETIC MODULE
READ PORT
DEBUG PORT
STATUS PORT
INTERRUPT PORT
WRITE PORT

SYSTEM FOR EXECUTION OF SECURITY RELATED FUNCTIONS

SYSTEM FOR EXECUTION OF SECURITY RELATED FUNCTIONS

This application relates to U.S. Provisional Application No. 61/934,940, filed Feb. 3, 2014, which is hereby incorporated by reference in its entirety.

FIELD OF THE INVENTION

The invention relates to security related functions generally and, more particularly, to a method and/or apparatus for implementing a system for execution of security related functions.

BACKGROUND

Public Key Authentication (PKA) algorithms such as RSA and elliptic curve cryptography (ECC) are used extensively for symmetric key establishment in systems that exchange encrypted data over the internet or mobile networks. The strength of the security algorithm is directly proportional to the length of the key used for encryption and decryption. The need for larger keys for enhanced security and fast processing requirements to meet the ever growing data bandwidth at base stations make the authentication mechanisms highly performance sensitive. The need for reducing cost and static power makes gate count minimization one of the primary goals in the design process. Due to its computationally intensive nature, novel approaches are needed to meet the performance goals of these systems.

SUMMARY

The invention concerns an apparatus having a first memory circuit, a plurality of arithmetic modules, and a plurality of second memory circuits. The first memory circuit may be configured to read or write data to or from a host. The plurality of arithmetic modules may each be configured to be enabled or disabled in response to control signals received from the first memory circuit. The plurality of second memory circuits may be configured to read or write data to or from the first memory circuit through a data exchange layer. The arithmetic modules provide cryptographic protection of the data.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing a system for execution of security related procedures that may (i) provide the ability to use a common hardware architecture to perform several cryptographic functions, (ii) provide functional and/or performance debugging both during simulation time as well as in hardware, (iii) provide a scalable solution with performance and gate count trade-off, (iv) provide software architecture that can transparently accelerate targeted cryptographic functions, (v) provide a single code base to seamlessly instantiate a high performance or low gate-count design, (vi) provide a firmware that uses a high level software programming language, such as a C program, to drive the hardware, (vii) provide a hardware architecture designed to achieve full parallelism, (viii) operate on large numbers, such as 8192 bit numbers, (ix) provide an efficient pipeline architecture, (x) provide a faster execution, and/or (xi) be implemented as one or more integrated circuits.

One embodiment provides an architecture to perform public key authentication. The architecture partitions the system into a hardware and a firmware component. The hardware may be implemented as a scalable design. The scalable design may achieve performance versus gate-count trade-off for different design goals. The firmware component drives the hardware. The firmware may be easily adapted to implement a variety of public key encryption systems. In one example, the hardware may be implemented in Verilog RTL. In one example, a firmware optimized for RSA may be developed in the C programming language. In one example, the C program may be integrated within a LibTomCrypt library. Encryption and/or decryption calls may use hardware accelerators. For example, given a dimension N, a prime number M ($2^{N-1}<M<2^N$), and a key K ($2^{N-1}<K<2^N$), the design objective may be to create an architecture to compute $X^N$MOD M for any input X, such that the computation is immune to power attacks, maximizes performance, and/or minimizes gate count.

Figure 1:
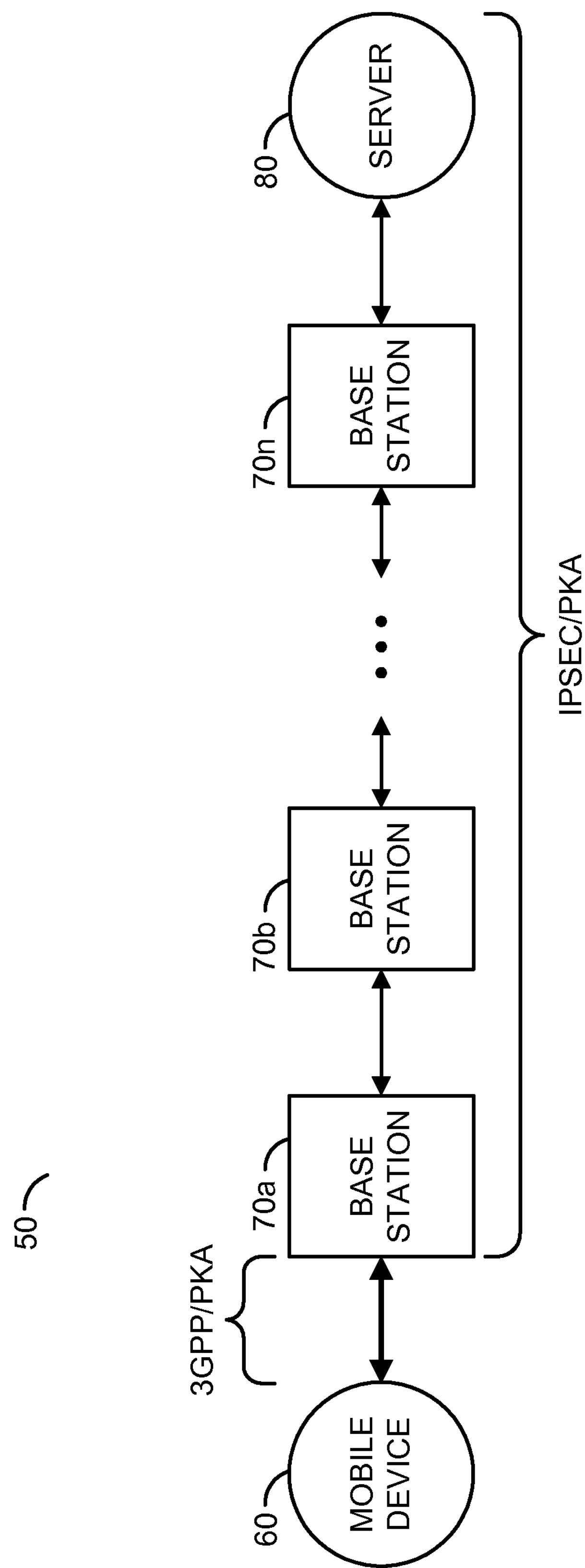
FIG. 1 is a diagram illustrating the role of a public key accelerator in a base station.

Referring to FIG. 1, a diagram illustrating the system 50 is shown. The system 50 describes the role of a public key accelerator in a base station. Generally, the system 50 comprises a block (or circuit) 60, a series of blocks (or circuits) 70*a*-70*n*, and a block (or circuit) 80. The block 60 is shown representing a communications device, such as a mobile device. The series of blocks 70*a*-70*n* may represent base stations. The block 80 may represent an end point, such as a server.

A mobile data packet may be sent from the communication device 60. The mobile data packet may pass through the multiple base stations 70*a*-70*n*. Each of the multiple base stations 70*a*-70*n* may be part of the Internet Protocol Security (IPSEC) domain. The mobile data packet may then reach the end point 80.

Depending on the shared keys that are agreed upon, each hop in the IPSEC domain is configured to implement a mechanism to exchange the shared key via a PKA protocol. The link between the mobile device 60 to the first base station 70*a* may implement a PKA process, such as a Diffie Hellman Key Exchange. The link between 70*a* and 70*b* may implement another PKA process, such as RSA. The link between 70*n* and 80 may implement yet another PKA process, such as ECC.

PKA encryption processes (such as RSA and ECC) are used extensively for symmetric key establishment in systems that exchange data over the internet and/or to mobile networks. In the base stations 70*a*-70*n*, a typical network bandwidth of 20 Giga bits per sec (Gbps) may be implemented. In the next few years, network bandwidth is expected to increase (e.g., to 100 Gbps). The hardware accelerators in the base stations 70a-70n perform public key authentication such as RSA. In general, authentication is done fast enough to not become a bottleneck in the processing pipeline. The operations are performed as much in parallel as possible, and each set of operations are as pipelined as possible.

With increasing security breaches, the specifications for RSA key length tend to increase with each generation. While 2048 bits are often considered mainstream, RSA key length in the near future is predicted to reach 8192 bits. Public key authentication operations involve exponentiation and are computationally expensive. For example, an 8192 bit RSA will use 8192 modular multiplications of two 8192 bit numbers which, in turn, corresponds to 8192*3=24486 total multiplications (assuming Montgomery reduction). Furthermore, if the architecture needs to safeguard against power attacks, each multiplication step is further composed of a squaring operation and/or a multiplication operation.

Figure 2:
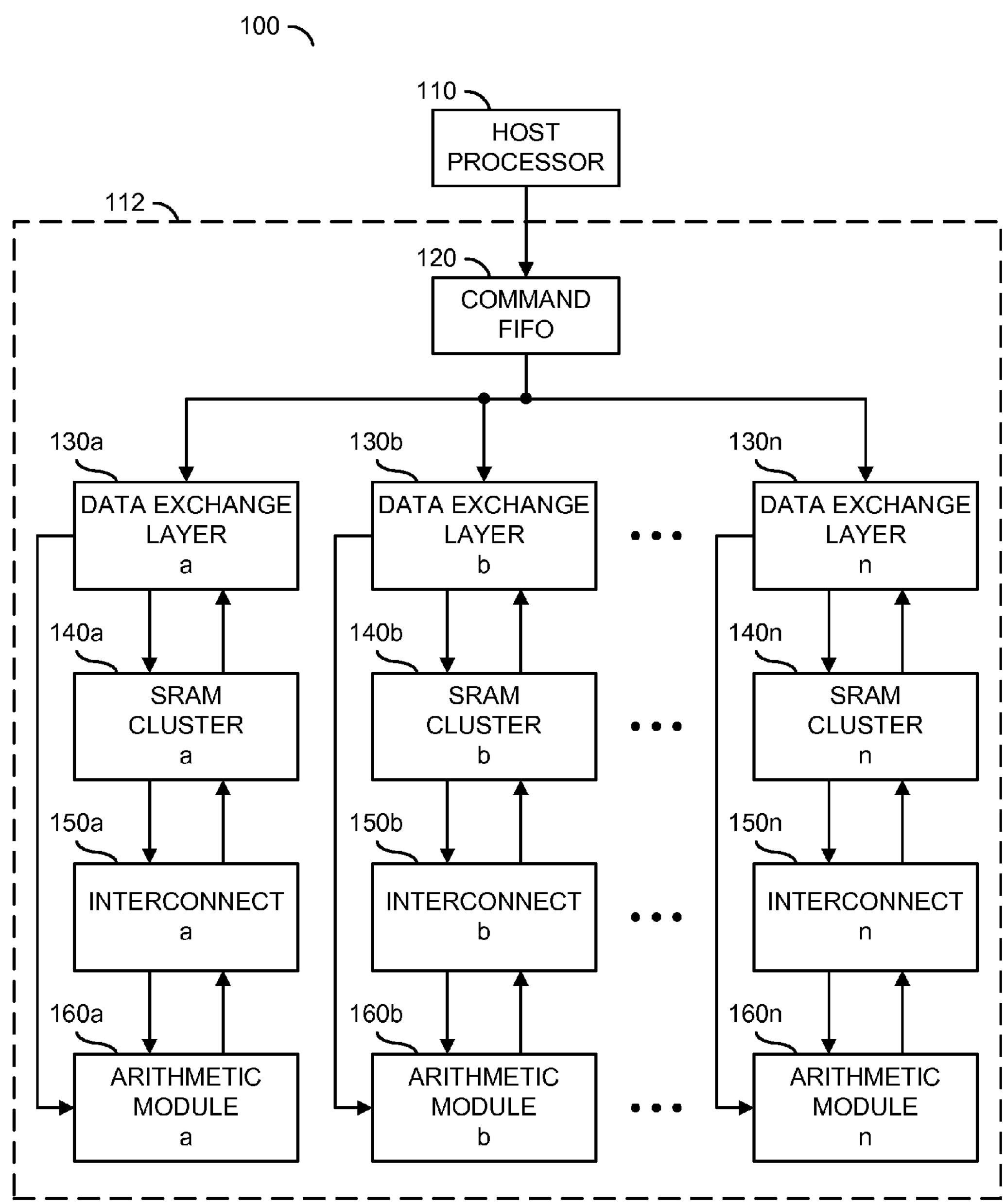
FIG. 2 is a diagram illustrating a scalable public key establishment system architecture.

Referring to FIG. 2, a diagram of a system 100 is shown. The system 100 is shown implementing a scalable public key establishment system architecture. In various embodiments, the system 100 comprises a block (or circuit) 110, and a block (or circuit) 112. The block 110 implements a host processor. The block 112 implements a PKA architecture.

The PKA architecture 112 generally comprises a block (or circuit) 120, a series of blocks (or circuits) 130a-130n, a series of blocks (or circuits) 140a-140n, a series of blocks (or circuits) 150a-150n, and a series of blocks (or circuits) 160a-160n. The block 120 implements a command FIFO. In various embodiments, the blocks 130a-130n may be implemented as one or more data exchange layers. In various embodiments, the blocks 140a-140n may be implemented as one or more SRAM clusters. In various embodiments, the blocks 150a-150n may be implemented as one or more interconnects. In various embodiments, the blocks 160a-160n may be implemented as one or more arithmetic modules. The entry point to the PKA architecture 112 may be the command FIFO 120. The host processor 110 may communicate with the PKA architecture 112 through the command FIFO 120.

The system 100 may be implemented as part of a larger System-on-Chip (SoC) that performs all the other networking functionality needed at the base station. The host processor 110 may be an application processor (e.g., an ARM Cortex-15 core, or similar architecture), or a dedicated smaller processor (e.g., a Cortex-M3 core, or similar architecture) that drives the PKA or other processor suitable for implementing a PKA. A PKA driver provides the necessary APIs for the host processor 110 to invoke the PKA operations. In one example, communication with the PKA architecture 112 by the host processor 110 may be through an ARM Advanced Extensible Interface (AXI) bus. The PKA architecture 112 may act as an AXI slave to the host processor 110. The PKA architecture 112 may include an AXI bus to the system memory. In one example embodiment, the system memory is treated as an AXI slave by the PKA.

In general, the host processor 110 writes instructions to the command FIFO 120 through the AXI interface. In general, the instructions need several cycles to execute. For example, an 8192 bit multiplier may take in the order of 160 cycles. Therefore, the command FIFO 120 may be shallow and still not be a performance bottleneck. In one example embodiment, an 8 deep command FIFO may be implemented. The instructions are then fed to the Data Exchange Layer (DEL) 130a-130n for further processing.

Each of the DELs 130a-130n may decode instructions read from the command FIFO 120. Each of the DELs 130a-130n may decode the address. Each of the DELs 130a-13On may then issue read (RD) or write (WR) commands to the SRAM clusters 140a-140n. Each of the DELs 130a-130n may issue execute requests to the arithmetic modules 160a-160n. Wire congestion at the DEL level may be minimized by configuring the DEL to operate as a "tree" of DELs. A tree of DELs may be similar to a network-on-chip structure. In an embodiment implemented using a tree of DELs, each DEL may decode the target of a particular one of the immediate children of a particular one of the DELs 130a-130n.

Each arithmetic module 160a-160n may be connected to a set of dedicated SRAMs 140a-140n, or other memory elements, via an interconnect 150a-150b. In one example, the connection may be via a Parallel Data Transfer (PDT) interconnect. The PDT may perform the functions of a crossbar (XBAR) interconnect (except arbitration). In one example, instead of utilizing arbitration, each master may have a unique port dedicated at each slave with which the master may communicate. To avoid arbitration overhead and achieve parallelism, the number of ports may be increased. Removing the arbitration units within the interconnects 150a-150n may also eliminate head-of-line blocking based deadlock situations.

The number of SRAMs in an SRAM cluster 140a-140n that each master may communicate with may be limited by setting the corresponding configuration parameters. Limiting the number of SRAMs each master communicates with may keep the number of ports within predetermined design limits. When a master communicates with an SRAM not within the connectivity of the master, the data may be explicitly moved from the DEL 130a-130n by a software instruction. Since the architecture of the system 100 may be massively pipelined, and because these movements are relatively few in an optimized firmware, the performance penalty due to the explicit data movement through software may be insignificant.

The arithmetic modules 160a-160n provide an arithmetic logic unit of the system 100. One or more arithmetic modules may be implemented in a system. The need for more arithmetic modules may be based on the performance objectives of the system 100. An arithmetic module may include two arithmetic module operations (AMOs). The AMOs may be a "multiplicative AMO or MAMO" and/or an "additive AMO of AAMO". The additive AMO may include adders, subtractors, and/or comparators and/or shifters that may operate on 8192 bit numbers. The multiplicative AMO will be described in more detail in FIG. 5.

Figure 3:
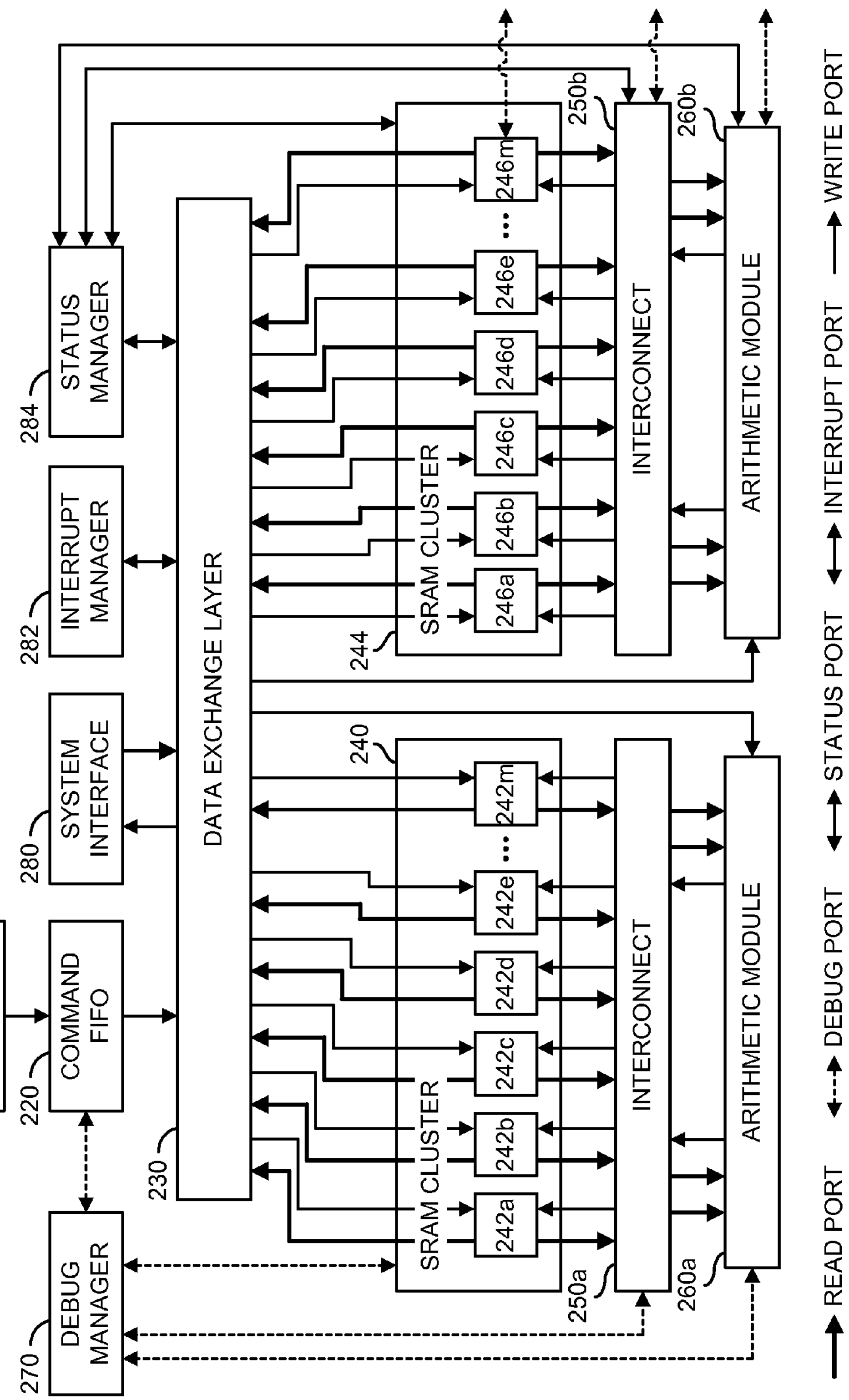
FIG. 3 is a diagram illustrating an example embodiment.

Referring to FIG. 3, a block diagram of the system 200 is shown illustrating an embodiment of the invention. The system 200 comprises a block (or circuit) 210, a block (or circuit) 220, a block (or circuit) 230, a block (or circuit) 240, a block (or circuit) 244, a block (or circuit) 250a, a block (or circuit) 250b, a block (or circuit) 260a, a block (or circuit) 260b, a block (or circuit) 270, a block (or circuit) 280, a block (or circuit) 282, and/or a block (or circuit) 284. The block 210 may be implemented as a host processor. The block 220 may be implemented as a command FIFO. The block 230 may be implemented as a data exchange layer. The blocks 240 and 244 may be implemented as a SRAM cluster. The blocks 250a and 250b may be implemented as an interconnect. The blocks 260a and 260b may be implemented as arithmetic modules. The block 270 may be implemented as a debug manager. The block 280 may be implemented as a system interface. The block 282 may be implemented as an interrupt manager. The block 284 may be implemented as a status manager.

The SRAM cluster 240 may contain SRAM modules **242*a*-242*m*. The SRAM cluster 244 may contain SRAM modules 246*a*-246*m*. SRAM modules 242*a*-242*m* and 246*a*-246*m* may be configured to achieve scalability and/or parallelism. The system 200 may implement a single data exchange layer 230. A single data exchange layer 230** may perform various operations. In various embodiments, a data exchange layer tree may be implemented to optimize performance and gate count.

The debug manager 270 may send signals to and/or receive signals from (i) the command FIFO 220, (ii) the SRAM clusters 240 and 244, (iii) the interconnects **250*a* and 250*b*, and/or (iv) the arithmetic modules 260*a* and 260*b***. The debug manager may provide a framework for fast functional and/or performance debugging. Debugging may be done at simulation time and/or in the hardware.

The system 200 may support post silicon debug through the debug manager 270. Post silicon debug may be performed utilizing the debug interface. The debug interface implements a GDB-like debugger. The debug interface may operate the PKA system 200 in step mode. The debug interface may insert breakpoints at different points in the firmware.

The interrupt manager 282 may include an interrupt register to communicate to the host processor 210 that an error has occurred. In an example embodiment, the PKA system 200 monitors timeout errors by reporting an error if an operation has been idle for more than a programmed timeout value. The status manager 284 may be used to execute conditional operations based on the status reported by the different units in the system 200.

The PKA system 200 may incorporate a dedicated power manager to perform coarse level power gating and a clock manager to perform coarse level clock gating. In various embodiments, fine grained clock and/or power gating may be performed by using power management tools such as Synopsys Power Compiler.

Figure 4:
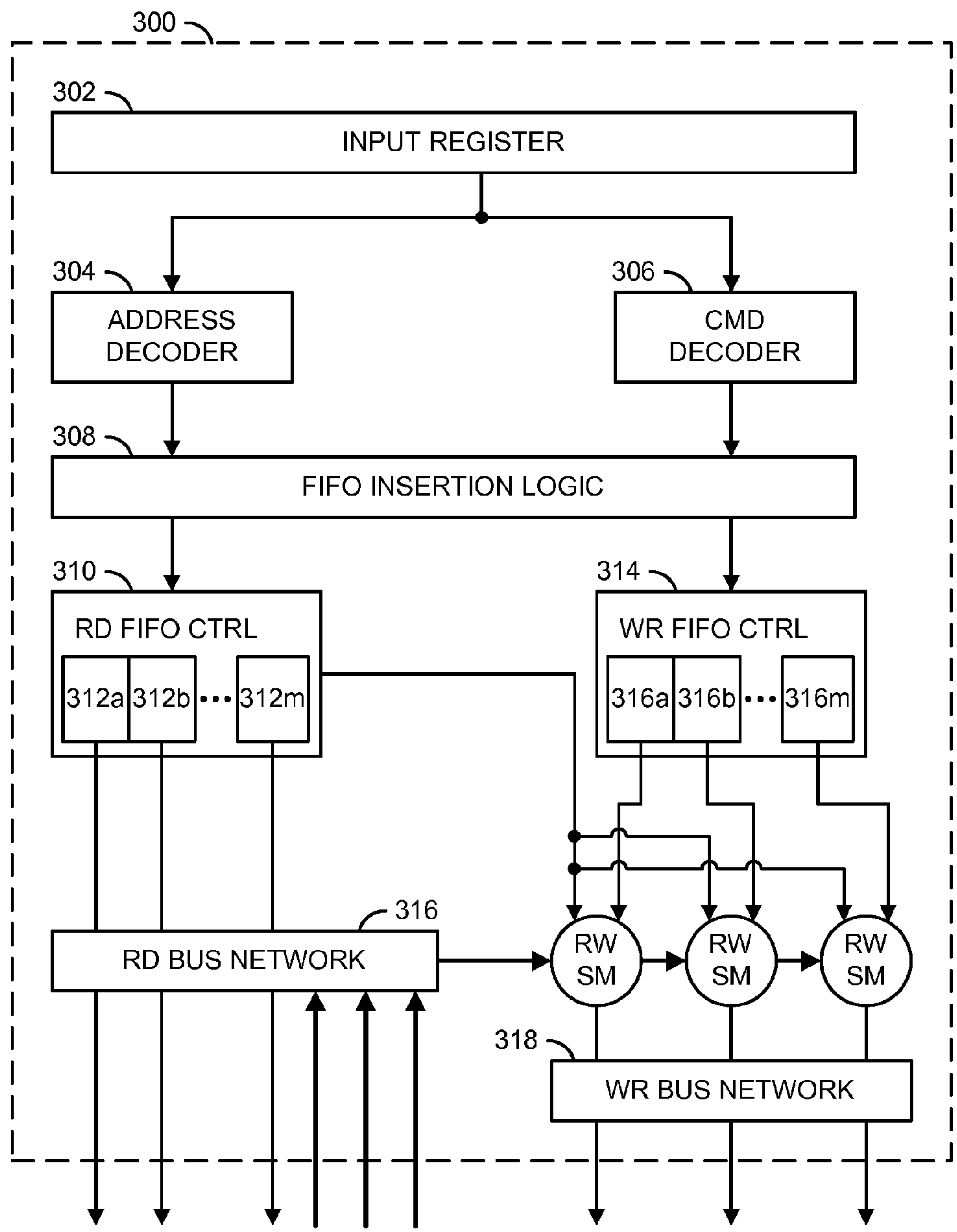
FIG. 4 is a diagram illustrating architecture of the data exchange layer.

Referring to FIG. 4, a diagram illustrating the architecture of a data exchange layer block 300 is shown. The data exchange layer block 300 illustrates an example of the data exchange layer blocks **130*a*-130*n* described in FIG. 2. The data exchange layer block 300 generally comprises a block (or circuit) 302, a block (or circuit) 304, a block (or circuit) 306, a block (or circuit) 308, a block (or circuit) 310, a block (or circuit) 314, a block (or circuit) 316, and a block (or circuit) 318. In one example, the block 302 may be implemented as an input register. In one example, the block 304 may be implemented as an address decoder. In one example, the block 306 may be implemented as a command decoder. In one example, the block 308 may be implemented as a FIFO insertion logic. In one example, the block 310 may be implemented as a read FIFO control. In one example, the block 314 may be implemented as a write FIFO control. In one example, the block 316 may be implemented as a read bus network. In one example, the block 318** may implement a write bus network.

The input register 302 may provide data and/or operations to the address decoder 304. The address decoder 304 may determine the actual targets to which the operations should be sent. Data from the address decoder 304 may be presented to the FIFO insertion logic block 308.

The input register 302 may provide data and/or operations to the command decoder 306. The command decoder 306 may determine the instruction and the type of operations that would be needed to execute an instruction. Data from the command decoder 306 may be presented to the FIFO insertion logic block 308. For example, if the instruction is a "COPY", the command decoder 306 may decode the operation as a "READ" from one memory location, and a "WRITE" to another memory location.

The FIFO insertion logic block 308 may provide data to the read FIFO control 310 and the write FIFO control 314. Data provided by the FIFO insertion logic block 308 may be optimized to achieve parallelism. In one example, the tuple represented by {operation, source, target} may determine the instructions to be loaded to the FIFO 310 and/or the FIFO 314.

The read FIFO control 310 may receive read instructions from the FIFO insertion logic block 308. The read FIFO control 310 may contain read FIFO control memory blocks **312*a*-312*m*. The read FIFO control memory blocks 312*a*-312*m* may be arranged to optimize parallelism in the data exchange layer block 300. The read FIFO control 310 may present signals to the read bus network 316**.

The write FIFO control 314 may receive write instructions from the FIFO insertion logic block 308. The write FIFO control 314 may contain write FIFO control memory blocks **316*a*-316*m*. The write FIFO control memory blocks 316*a*-316*m* may be arranged to optimize parallelism in the data exchange layer block 300. The write FIFO control 314 may present a signal to the write bus network 318. The read bus network 316 may send and/or receive data to a corresponding SRAM cluster 140*a*-140*n*. The write bus network 318 may send data to a corresponding SRAM cluster 140*a*-140*n***.

In one example implementation, the data exchange layer block 300 may maintain one read FIFO control 310 and/or one write instruction FIFO 314 per target. The interface from the data exchange layer block 300 to the rest of PKA architecture 112 may resemble an AXI interface with separate RD and WR channels. Implementing separate RD and/or WR channels may achieve full parallelism between RD and/or WR operations.

The data exchange layer block 300 ensures strong ordering of traffic for requests targeted to the same memory. In one example, the following two requests may be strictly ordered:

COPY MEM-1 MEM-0

MOV MEM-2 MEM-1

The MOV operation may not start before the COPY operation is completed. Without a strict ordering mechanism, software would be used to take care of every ordering issue. With a strict ordering mechanism, a software developer may instead focus on optimizing the software (e.g., for efficiency and/or performance).

The parallel architecture of the DEL 300 may allow multiple instructions to disparate targets to be executed in parallel. In one example, the following two instructions may be executed in parallel:

COPY MEM-1 MEM-0

COPY MEM-2 MEM-3

Figure 5:
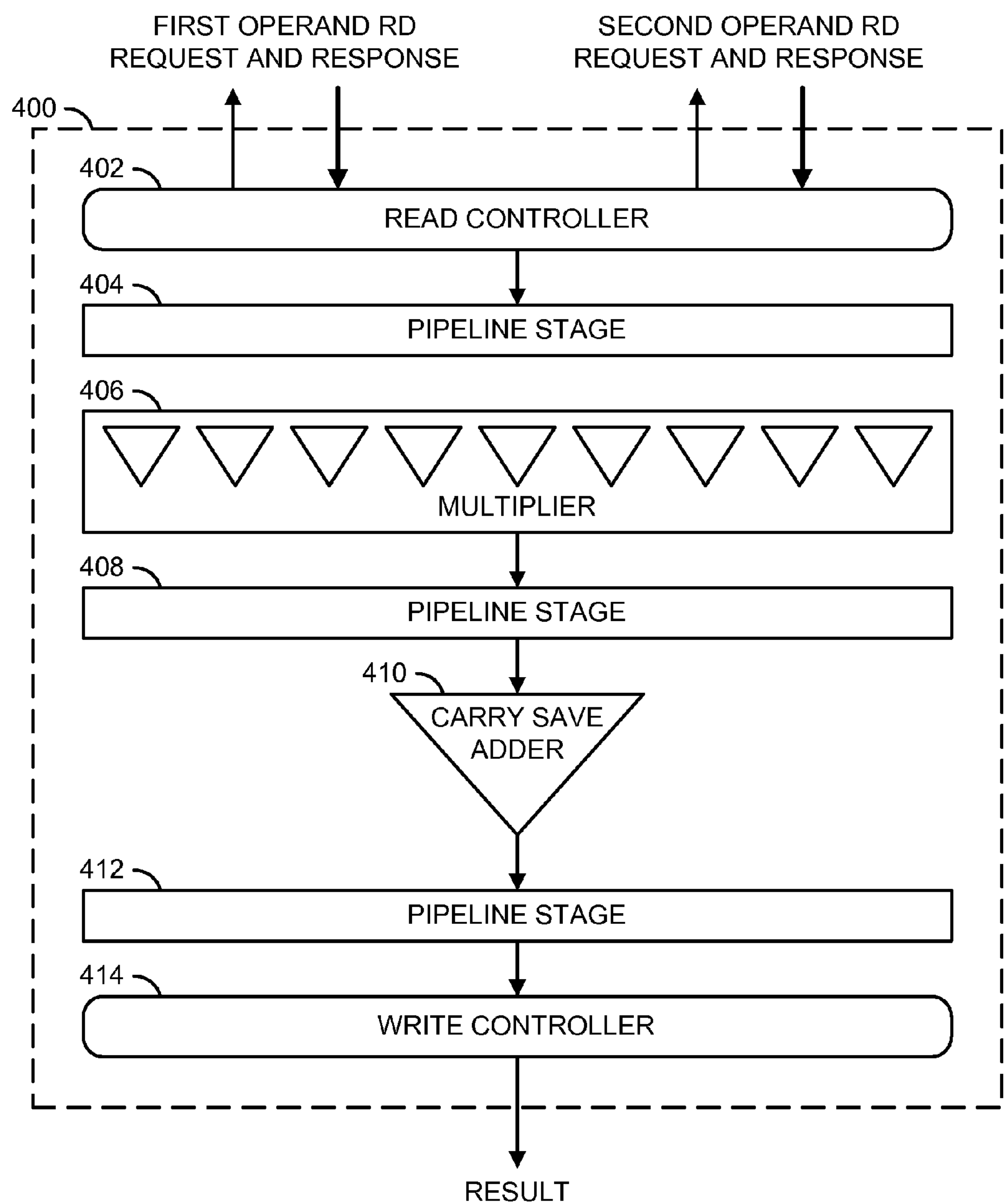
FIG. 5 is a diagram illustrating the multiplier architecture.

Referring to FIG. 5, a diagram illustrating a multiplier architecture circuit 400 is shown. The multiplier architecture circuit 400 generally comprises a block (or circuit) 402, a block (or circuit) 404, a block (or circuit) 406, a block (or circuit) 408, a block (or circuit) 410, a block (or circuit) 412, and a block (or circuit) 414. In one example, the circuit 402 may be a read controller. In one example, the circuit 404 may be a pipeline stage for the read controller. In one example, the circuit 406 may be a multiplier. In one example, the circuit 408 may be a pipeline stage for the multiplier. In one example, the circuit 410 may be a carry save adder. In one example, the circuit 412 may be a pipeline stage for the write controller. In one example, the circuit 414 may be a write controller.

The read controller 402 may receive and respond to a first operand data and a second operand data. The read controller 402 may send data to the pipeline stage 404. The pipeline stage 404 may eliminate bottlenecks in the read operations of the multiplier circuit 400.

The multiplier 406 may perform multiplication operations on data. The multiplier may send data to the pipeline stage 408. The pipeline stage 408 may eliminate bottlenecks in the multiplication operations of the multiplier circuit 400. The pipeline stage 408 may send data to the carry and save adder 410. The carry and save adder 410 may perform mathematical operations. The carry and save adder 410 may send data to the pipeline stage 412. The pipeline stage 412 may reduce and/or eliminate bottlenecks in the operations of the multiplier circuit 400. The pipeline stage 412 may send data to the write controller 414. The write controller 414 may present data as an output signal (e.g., RESULT).

Generally, the MAMOs are the most complex part of the PKA system 112. The efficiency of the PKA system 112 may be dependent on the efficiency of the implemented multiplier architecture 400. Conversely, the implementation of the multiplier architecture 400 may impact the gate-count of the PKA system 112.

In one example embodiment of the multiplier architecture 400, an 8192 bit multiplier may be implemented from nine 128 bit multipliers. The 8192 bit multiplier may be implemented by applying a two level Karatsuba technique and/or a state machine. Traditional multiplication processes implement four multipliers. The Karatsuba technique generates a 2N×2N multiplier with three N×N multipliers. A 256 bit multiplier may be implemented with three 128 bit multipliers. A 512 bit multiplier may be implemented with three instances of the 256 bit multipliers.

In one example embodiment, the read controller 402 and the write controller 414 may implement the 512 bit multiplier from the individual 128 bit multipliers. The controllers 402 and 414 and the multiplier may be decoupled. Decoupling the controllers and the multiplier may allow the same hardware to implement a different bit multiplier by modifying one or more of the controllers. The same hardware may also implement a different algorithm to perform the 512 bit multiplication.

The multiplier 406 and the carry save adder 410 may operate in a pipelined fashion. For example, with N>512 (and assuming N is a multiple of 512), a N bit multiplier may be created by invoking the 512 bit multiplier 4^(N/512−1) times. At lower levels, the Karatsuba method may use 3^(N/512−1) multiplications. A lower efficiency multiplication method may be preferred because the memory fetches may align themselves better to a pipelined behavior. An overall pipelined operation of several 8192 bit multipliers may be implemented for the exponentiation process.

The PKA architecture 112 may implement the following instructions: i) Copy, ii) Move, iii) Remove, iv) Exec, and v) Zeroize, and/or Sync. The operating semantic "Copy DST SRC N" may read N bytes from the starting SRC address to the address SRC+N−1, and write the N bytes in the address starting at DST to DST+N−1. The operating semantic "MOVE DST SRC N" may read N bytes from the starting SRC address to the address SRC+N−1, and write the N bytes in the address starting at DST to DST+N−1. The address from SRC to SRC+N−1 may be marked as invalid. The operating semantic "REMOVE SRC N" may read N bytes by starting from the address SRC and reading towards the address SRC+N−1 and discarding the bytes read. The address from SRC to SRC+N−1 may be marked as invalid. The operating semantic "Exec ALU-ID Options" may send an execute command to the ALU with an ID given by ALU-ID. Other options may be specified in the Options parameter. The value presented in the option may indicate the starting addresses of operands for the ALU, the destination addresses, and/or the types of operations to execute (e.g., multiplication, addition, subtraction and/or compare). The operating semantic "ZEROIZE SRC N" may write zeros at the address SRC to the address SRC+N−1. Generally, the ZEROIZE instruction is used to initialize the local memories. The operating semantic "SYNC" may backpressure the PKA system 112 until all outstanding operations are completed. The SYNC command may be useful in implementing certain barrier conditions. The SYNC command may be used to implement strong ordering semantics at the host processor 110. Both the SYNC and ZEROIZE commands may be useful tools when the hardware needs to be debugged during post silicon testing.

Figure 6:
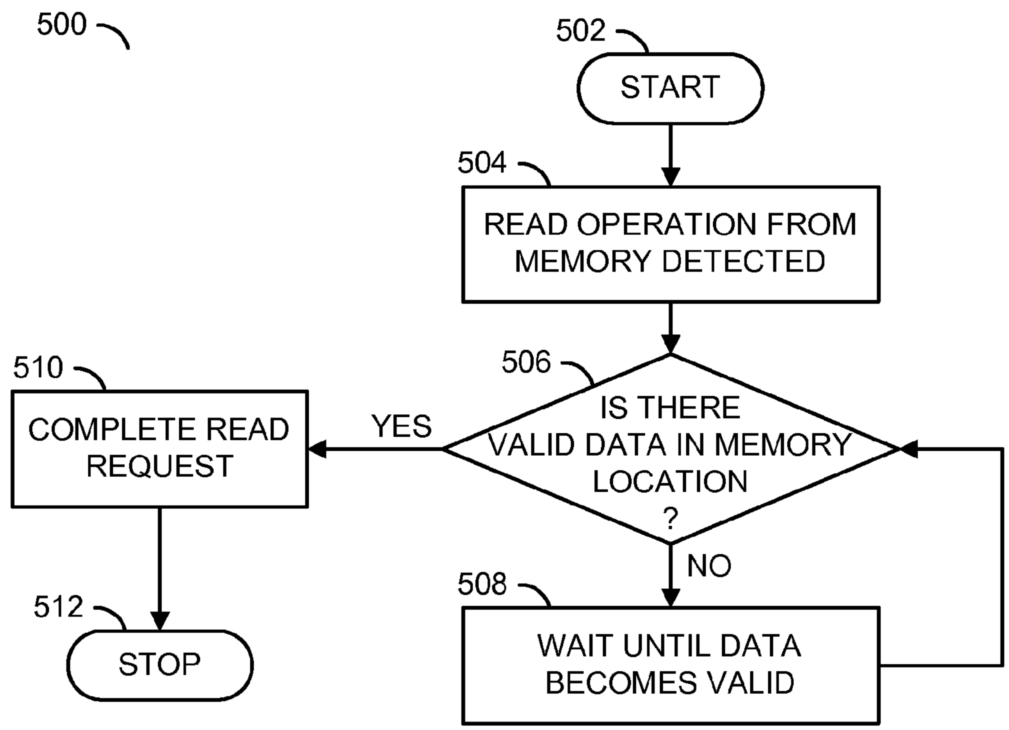
FIG. 6 is a flow diagram of a process to perform a read operation from a memory location while ensuring a deadlock free operation.

Referring to FIG. 6, a flow diagram of a method (or process) 500 is shown. The method 500 may perform a read operation from a memory location while ensuring a deadlock free operation. The method 500 generally comprises a step (or state) 502, a step (or state) 504, a decision step (or state) 506, a step (or state) 508, a step (or state) 510, and a step (or state) 512. The state 502 may start the method 500. The state 504 may detect a read operation from memory. Next, the method 500 moves to the decision state 506. In the decision state 506, if the method 500 determines there is valid data in the memory location the method 500 moves to the state 510. The state 510 may complete the read request. Next, the state 512 may end the method 500. If the decision state 506 determines there is not valid data in the memory location, the method 500 moves to the state 508. The state 508 may wait until the data in the memory location becomes valid.

Figure 7:
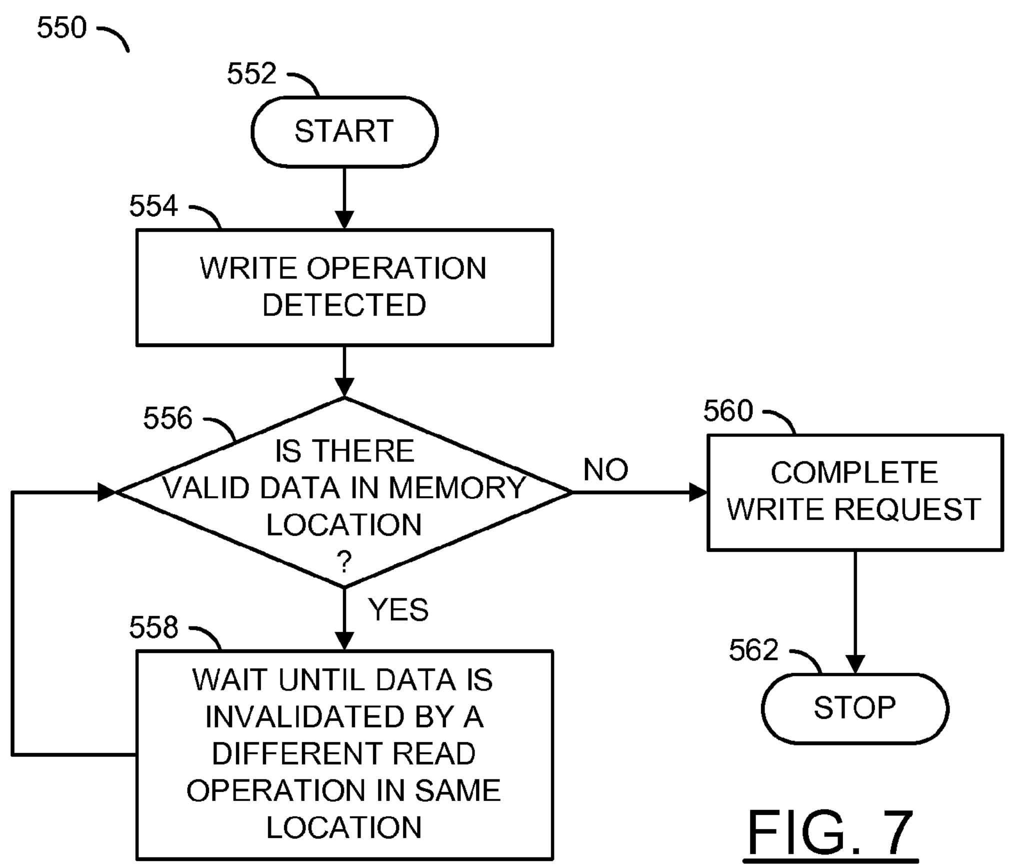
FIG. 7 is a flow diagram of a process to perform a write operation from a memory location while ensuring a deadlock free operation.

Referring to FIG. 7, a flow diagram of a method (or process) 550 is shown. The method 550 may perform a write operation from a memory location while ensuring a deadlock free operation. The method 550 generally comprises a step (or state) 552, a step (or state) 554, a decision step (or state) 556, a step (or state) 558, a step (or state) 560, and a step (or state) 562. The state 552 may start the method 550. The state 554 may detect a write operation. Next, the decision state 556 may determine whether there is valid data in the memory location. If yes, the method 550 moves to the state 558. The state 558 may wait until the data in the memory location is invalidated by a different read operation in the same location. Next, the method 550 moves to the decision state 556. In the decision state 556, if the method 550 determines there is not valid data in the memory location the method 550 moves to the state 560. The state 560 may complete the write request. Next, the state 562 may end the method 550.

In an example embodiment, memory locations may not be overwritten. A memory location may not be invalidated while there is a pending read operation on the memory. The method 500 and the method 550 may prevent the system 100 from entering into a deadlock situation.

An example of a common deadlock situation in the computation of modular multiplication may be when ALU-0 reads a memory location X0, performs an operation, and writes to location X1; ALU-1 reads X1, performs an operation, and writes the result to location X2; and ALU-2 reads X2, performs an operation and writes the result back to X0. If the result (location X0) has to be moved to the system memory, a typical set of instructions for this operation may be as follows:

X1=ALU-0(X0)
X2=ALU-1(X1)
X0=ALU-2(X2)
MOV SYSMEM X0

Although the program may impose an order for the operations, the MOV instruction may be re-ordered within the PKA architecture 112. The MOV instruction may not be re-ordered if a SYNC command was issued. In one example, an old value of X0 may be moved to the system memory before ALU-2 has completed the operation. The MOV operation may invalidate X0 and ALU-0 may never complete the operation. The chaining of dependent operations may cause each ALU to wait for data resulting in a deadlock situation.

The deadlock situation may be solved by ensuring that the memory being read is never invalidated. The instructions may be replaced with:

X1=ALU-0(X0)
X2=ALU-1(X1)
X3=ALU-2(X2)
MOV SYSMEM X3

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The functions performed by the diagrams of FIGS. 6-7 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is, described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to embodiments thereof, it will be understood by those skilled in the art that various changes in form and details may be made without departing from the scope of the invention.

The invention claimed is:

1. An apparatus comprising:

a first memory circuit configured to read or write data to or from a host;

an arithmetic logic circuit communicatively coupled to said first memory circuit, said arithmetic logic circuit comprising a plurality of arithmetic modules each configured to be enabled or disabled in response to control signals received from said first memory circuit and each having a number of multipliers proportional to a size of a public key; and a plurality of second memory circuits configured to read or write data to or from said first memory circuit through a data exchange layer having a separate read channel and a separate write channel, wherein said arithmetic modules provide cryptographic protection of said data by generating results of two or more arithmetic operations to implement said public key.

2. The apparatus according to claim 1, wherein said public key includes at least one of a Diffie Hellman Key Exchange function, an RSA function, and an elliptic curve cryptography function.

3. The apparatus according to claim 1, wherein said apparatus is configured to provide functional and performance debugging during simulation and after hardware is designed.

4. The apparatus according to claim 1, wherein said apparatus is configured to provide scalability to implement a plurality of key lengths.

5. The apparatus according to claim 4, wherein said scalability provides a trade-off between performance and gate count.

6. The apparatus according to claim 1, wherein said cryptographic protection is accelerated by implementing a software architecture.

7. The apparatus according to claim 6, wherein said software architecture is configured to transparently accelerate targeted cryptographic functions.

8. The apparatus according to claim 1, wherein said apparatus includes a single code base configured to seamlessly instantiate a high performance and low gate count design.

9. The apparatus according to claim 1, wherein said apparatus includes a firmware implemented with a high level software programming language to operate said apparatus.

10. The apparatus according to claim 9, wherein said high level software programming language comprises C.

11. The apparatus according to claim 1, wherein said apparatus is configured to implement parallelism.

12. The apparatus according to claim 1, wherein said arithmetic modules operate on 8192 bit numbers.

13. The apparatus according to claim 1, wherein said apparatus is configured to provide an efficient pipeline architecture.

14. The apparatus according to claim 1, wherein said apparatus is implemented as one or more integrated circuits.

15. The apparatus according to claim 1, wherein said firmware implements a command FIFO for facilitating communications between the host and the arithmetic logic circuit.

16. The apparatus according to claim 15, wherein said plurality of second memory circuits includes a plurality of targets, and for each target said data exchange layer implements at least one of a read FIFO control or a write FIFO instruction.

17. The apparatus according to claim 1, wherein said plurality of second memory circuits comprise connected memory circuits and disconnected memory circuits, and wherein said data exchange layer facilitates communication to both connected and disconnected memory circuits.

18. The apparatus according to claim 1, wherein said plurality of arithmetic modules include one or more carry and save adders and more than four multipliers.

19. A computer implemented method for providing cryptographic protection of data, comprising a memory with one or more instructions and a processor to implement the instructions to perform the steps of:

(A) reading or writing said data in a first memory circuit to or from a host;

(B) enabling or disabling a number of multipliers of a plurality of arithmetic modules in response to control signals received from said first memory circuit to implement a public key, wherein the number of multipliers enabled or disabled is proportional to a size of said public key; and (C) reading or writing said data in a second memory circuit to or from said first memory circuit through a data exchange layer with a separate read channel and a separate write channel, wherein said arithmetic modules provide cryptographic protection of said data by generating results of two or more arithmetic operations to implement said public key.

20. An apparatus comprising:

a driver for reading or writing data in a first memory circuit to or from a host;

one or more hardware accelerators communicatively coupled to said driver and configured to enable or disable a plurality of arithmetic modules in response to control signals received from said first memory circuit; and one or more bus networks for reading or writing said data in a second memory circuit to or from said first memory circuit through a data exchange layer having separate read and write channels, wherein said arithmetic modules provide cryptographic protection of said data by computing two or more arithmetic operations to authenticate a public key, and wherein said data exchange layer comprises a tree of data exchange layers corresponding to said plurality of arithmetic modules.

* * * * *